(12) United States Patent
Han

(10) Patent No.: US 12,675,193 B2
(45) Date of Patent: Jul. 7, 2026

(54) SENSING DRIVING DEVICE AND SENSING DRIVING METHOD

(71) Applicant: LX SEMICON CO., LTD., Daejeon (KR)

(72) Inventor: Keon Woo Han, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/981,870

(22) Filed: Dec. 16, 2024

(65) Prior Publication Data

US 2025/0199641 A1     Jun. 19, 2025

(30) Foreign Application Priority Data

Dec. 19, 2023   (KR) ........................ 10-2023-0186379
Aug. 5, 2024   (KR) ........................ 10-2024-0104199

(51) Int. Cl.
*G06F 3/041*        (2006.01)

(52) U.S. Cl.
CPC .................................. *G06F 3/0418* (2013.01)

(58) Field of Classification Search
USPC .............................................. 345/173–174
See application file for complete search history.

(56) References Cited

U.S. PATENT DOCUMENTS

| | | | |
|---|---|---|---|
| 11,269,456 B1 * | 3/2022 | Eilers .................. | G06F 3/04186 |
| 2015/0091859 A1 * | 4/2015 | Rosenberg ............ | G06F 3/0446 |
| | | | 345/174 |
| 2022/0137782 A1 * | 5/2022 | Seger, Jr. .............. | G06F 3/0412 |
| | | | 345/156 |
| 2023/0214057 A1 * | 7/2023 | Lee .......................... | G09G 3/20 |
| | | | 345/173 |
| 2023/0350519 A1 * | 11/2023 | Derichs ............... | G06F 3/04164 |
| 2024/0361866 A1 * | 10/2024 | Price ..................... | G06F 3/0418 |

FOREIGN PATENT DOCUMENTS

| | | | | |
|---|---|---|---|---|
| AU | 2007342148 A1 * | 7/2008 | ........ | G06F 3/04166 |
| KR | 20160082986 A * | 7/2016 | ............ | G01L 1/146 |
| KR | 10-2021-0084985 A | 7/2021 | | |
| WO | WO 2020/171511 A1 | 8/2020 | | |

* cited by examiner

*Primary Examiner* — Kwin Xie
(74) *Attorney, Agent, or Firm* — POLSINELLI PC

(57)        ABSTRACT
A sensing driving device includes a sensing circuit configured to obtain raw data from a panel; and a processor configured to obtain delta data from the raw data using a baseline value. The processor is configured to obtain whether the delta data is included in any one of a first range, a second range, and a third range, and detect different noises in accordance with the range in which the delta data is included. The first range is a range in which the delta data is located below the baseline value, the second range is a range in which the delta data is located between the baseline value and a touch-on threshold, and the third range is a range in which the delta data is located above the touch-on threshold. The touch-on threshold is greater than the baseline value.

18 Claims, 13 Drawing Sheets

| |
|---|
| obtain whether the delta data is included in any one of a first range, a second range, and a third range ~S210 |

↓

| |
|---|
| detect different noises in accordance with the range in which the delta data is included ~S220 |

Touch Off

| | 7 | 8 | 9 | 10 | 11 | 12 | 13 | 14 | 15 | 16 | 17 | 18 | 19 | 20 |
|----|----|----|----|----|----|----|----|----|----|----|----|----|----|----|
| 4 | X | X | X | X | X | X | X | X | X | X | X | X | X | X |
| 5 | X | X | X | X | X | X | X | X | X | X | X | X | X | X |
| 6 | X | X | X | X | X | X | X | X | X | X | X | X | X | X |
| 7 | X | X | X | X | X | X | X | X | X | X | X | X | X | X |
| 8 | X | X | X | X | X | X | X | X | X | -25 | X | X | X | X |
| 9 | X | X | X | X | X | X | X | X | -35 | -50 | -35 | X | X | X |
| 10 | X | X | X | X | X | X | X | X | X | -45 | X | X | X | X |
| 11 | X | X | X | X | X | X | X | X | X | X | X | X | X | X |
| 12 | X | X | X | X | X | X | X | X | X | X | X | X | X | X |
| 13 | X | X | X | X | X | X | X | X | X | X | X | X | X | X |
| 14 | X | X | X | X | X | X | X | X | X | X | X | X | X | X |
| 15 | X | X | X | X | X | X | X | X | X | X | X | X | X | X |

FIG. 12A

Touch On

FIG. 12B

Touch Off

SENSING DRIVING DEVICE AND SENSING DRIVING METHOD

CROSS-REFERENCE TO RELATED APPLICATIONS

The present application claims the priorities of Korean Patent Application No. 10-2023-0186379, filed on Dec. 19, 2023 and Korean Patent Application No. 10-2024-0104199, filed on Aug. 5, 2024, which are hereby incorporated by reference in their entirety.

BACKGROUND

Field of the Disclosure

The present disclosure relates to a sensing driving device and a sensing driving method.

Description of the Background

A display device may comprise a panel having a touch function and a touch
driving device. The display device is adopted in various electronic devices. The display device executes a desired function or program in response to a touch on the panel.

The touch driving device recognizes a touch or proximity by an object based on sensing signals received from a plurality of touch lines of the panel.

Meanwhile, if noise is introduced during an actual touch or an Electrostatic Discharge (ESD) test on the panel, the sensing signal obtained from the panel may be distorted, causing misrecognition or malfunction of the actual touch or ESD test.

There have been attempts to detect and remove the noise described above. When the noise intensity is large, it is easy to detect, but when the noise intensity is small, it is difficult to detect.

In particular, when the noise intensity is small, it has an intensity similar to that of no-touch, power-on-palm, or ESD testing, making it difficult to distinguish whether the noise is a signal of no-touch, power-on-palm operation, or ESD testing.

The above information disclosed in this Background section is only for enhancement of understanding of the background of the described technology and therefore it may contain information that does not form prior art that is already known to a person of ordinary skill in the art.

SUMMARY

Accordingly, the present disclosure is directed to a sensing driving device and a sensing driving method that substantially obviate one or more of problems due to limitations and disadvantages described above.

More specifically, the present disclosure is to provide a sensing driving device and a sensing driving method capable of accurately detecting noise regardless of the intensity or type of noise.

In addition, the present disclosure is to provide a sensing driving device and a sensing driving method capable of easily detecting noise similar to a signal during a power-on palm or an Electrostatic Discharge (ESD) test.

The present disclosure is not limited to those described in this item, and include those that may be understood through the description of the disclosure.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a sensing driving device may include a sensing circuit configured to obtain raw data from a panel; and a processor configured to obtain delta data from the raw data using a baseline value, wherein the processor is configured to: obtain whether the delta data is included in any one of a first range, a second range, and a third range, and detect different noises in accordance with the range in which the delta data is included, wherein the first range is a range in which the delta data is located below the baseline value, the second range is a range in which the delta data is located between the baseline value and a touch-on threshold, and the third range is a range in which the delta data is located above the touch-on threshold, and wherein the touch-on threshold is greater than the baseline value.

In another aspect of the present disclosure, a sensing driving method may include obtaining whether delta data is included in any one of a first range, a second range, and a third range; and detecting different noises according to a range including the delta data, wherein the delta data is obtained from the raw data using a baseline value, wherein the first range is a range in which the delta data is located below the baseline value, the second range is a range in which the delta data is located between the baseline value and a touch-on threshold, and the third range is a range in which the delta data is located above the touch-on threshold, and wherein the touch-on threshold is greater than the baseline value.

The effects of the sensing driving device and the sensing driving method according to the aspect are described as follows.

Various noises may be easily detected regardless of the noise type. In addition, the hopping frequency may be changed to different hopping frequencies according to the type of the detected noise, so that the corresponding noise may be offset or alleviated.

It is possible to easily detect noise similar to a signal during a power-on farm or an ESD test by using whether the coordinates of the current frame are located in the peripheral nodes of the predicted coordinates of the previous frame.

It is possible to easily detect noise similar to no-touch using a touch on/off toggle.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings:

FIG. 7B illustrates a state in which noise above and below a touch-on threshold is detected according to the present disclosure;

FIG. 10B illustrates the delta data detected by the power on palm (or ESD test);

FIGS. 12A and 12B illustrate how the touch on/off toggle occurs;

Figure 1:
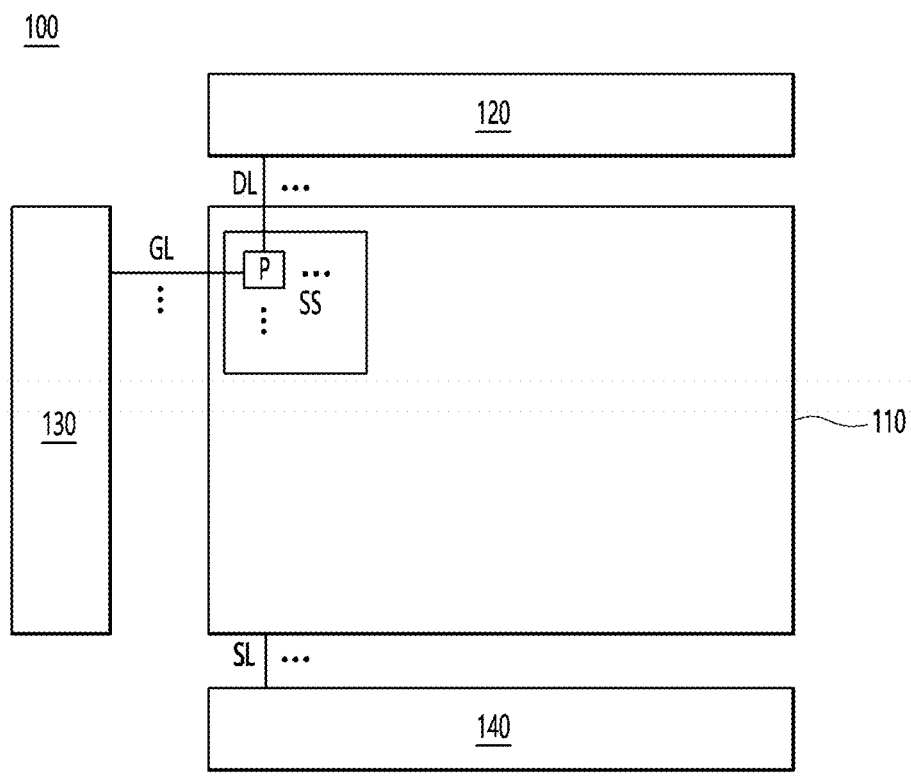
FIG. 1 is a configuration diagram of a display device according to a first aspect of the present disclosure.

The size, shape, and number of the components illustrated in the drawings may differ from the actual ones. In addition, even if the same components are illustrated with different sizes, shapes, and numbers between the drawings, this is only an example in the drawings, and the same components may have the same sizes, shapes, and numbers between the drawings.

DETAILED DESCRIPTION

Hereinafter, the aspects disclosed in this specification will be described in detail with reference to the attached drawings. Regardless of the drawing symbols, identical or similar components will be given the same reference numbers and redundant descriptions thereof will be omitted. The suffixes 'module' and 'part' used for components in the following description are given or used interchangeably in consideration of the ease of writing the specification, and do not have distinct meanings or roles in themselves. In addition, the attached drawings are intended to facilitate easy understanding of the aspects disclosed in this specification, and the technical ideas disclosed in this specification are not limited by the attached drawings. In addition, when an element such as a layer, region, or substrate is mentioned as existing 'on' another element, this includes that it may be directly on the other element or that other intermediate elements may exist between them.

Hereinafter, "~module", "~part", etc. may be configured as "~circuit" or "integrated circuit." Accordingly, "~module", "~part", etc. may be used interchangeably with "~circuit" or "integrated circuit".

FIG. 1 is a configuration diagram of a display device according to the first aspect of the present disclosure.

Referring to FIG. 1, a display device 100 according to the present disclosure may comprise a panel 110, a data driving device 120, a gate driving device 130, and a sensing driving device 140.

In the present disclosure, the panel 110 may comprise a liquid crystal display panel, an organic light-emitting display panel, etc., but is not limited thereto.

The panel 110 may comprise a plurality of gate lines GL, a plurality of data lines DL, and a plurality of pixels P. The plurality of gate lines GL may be connected to the gate driving device 130. The plurality of data lines DL may be connected to the data driving device 120. A plurality of pixels P may be connected to a plurality of gate lines GL and a plurality of data lines DL.

The sensing cell SS may comprise a sensing electrode. The sensing electrode may comprise a first sensing electrode and a second sensing electrode, but is not limited thereto. A predetermined electrostatic capacitance may be formed between the first sensing electrode and the second sensing electrode. A driving signal may be provided to the first sensing electrode, and a sensing signal may be output from the second sensing electrode. When a touch occurs by an object or an object approaches the sensing cell SS, the electrostatic capacitance between the first sensing electrode and the second sensing electrode may change, and the changed capacitance may be output as a sensing signal. The object may comprise a hand, a finger, a pen, etc. Only one sensing electrode may be provided without being divided into the first sensing electrode and the second sensing electrode, so that object sensing may be performed.

The display panel and the sensing panel may share some components with each other. As an example, the display panel and the sensing panel may share the upper substrate with each other.

As another example, the sensing electrodes constituting the sensing cell SS in the sensing panel and the common electrodes constituting the pixel P in the display panel may be shared with each other.

As another example, the sensing electrodes constituting the sensing cell SS in the sensing panel and the common electrodes constituting the pixel P in the display panel may not be shared with each other but may be provided independently.

Meanwhile, the data driving device 120 may provide a data signal to a data line DL for displaying a data signal to each pixel P of the panel 110 in order to display an image signal.

The gate driving device 130 may sequentially provide a scan signal to a plurality of gate lines GL in order to turn on or off a transistor located in each pixel P.

The gate driving device 130 may be located on only one side of the panel 110 as shown in the drawing, depending on the driving method, or may be divided into two and located on both sides of the panel 110.

The sensing driving device 140 supplies driving signals to all or part of the plurality of sensing cells SS connected to the plurality of sensing lines SL.

As an example, the sensing driving device 140 may be configured separately from the data driving device 120 and the gate driving device 130. For example, the data driving device 120, the gate driving device 130, and the sensing driving device 140 may each be configured as individually integrated circuits. As another example, depending on the implementation method, the sensing driving device 140 may be included in the data driving device 120 or the gate driving device 130. As another example, the data driving device 120, the gate driving device 130, and the sensing driving device 140 may be configured as an integrated circuit integrated into one.

This sensing driving device 140 is not limited in the implementation and design method, and in the present disclosure, when only its performance function is the same or similar, it may be another configuration itself or may be provided inside or outside another configuration.

Although one sensing driving device 140 is provided in the drawing, two or more sensing driving devices 140 may be provided.

Meanwhile, the display device 100 may adopt an object sensing method of an electrostatic capacitance type that recognizes the touch or proximity of an object by detecting a change in electrostatic capacitance through a sensing cell SS.

The capacitance type object sensing method may be divided into, for example, a mutual capacitance type object sensing method and a self-capacitance type object sensing method.

The display device 100 may adopt one of the two capacitance type object sensing methods described above, that is, the mutual capacitance type object sensing method and the self-capacitance type object sensing method. Hereinafter, for the convenience of explanation, embodiments will be described assuming that the mutual capacitance type object sensing method is adopted.

Figure 2:
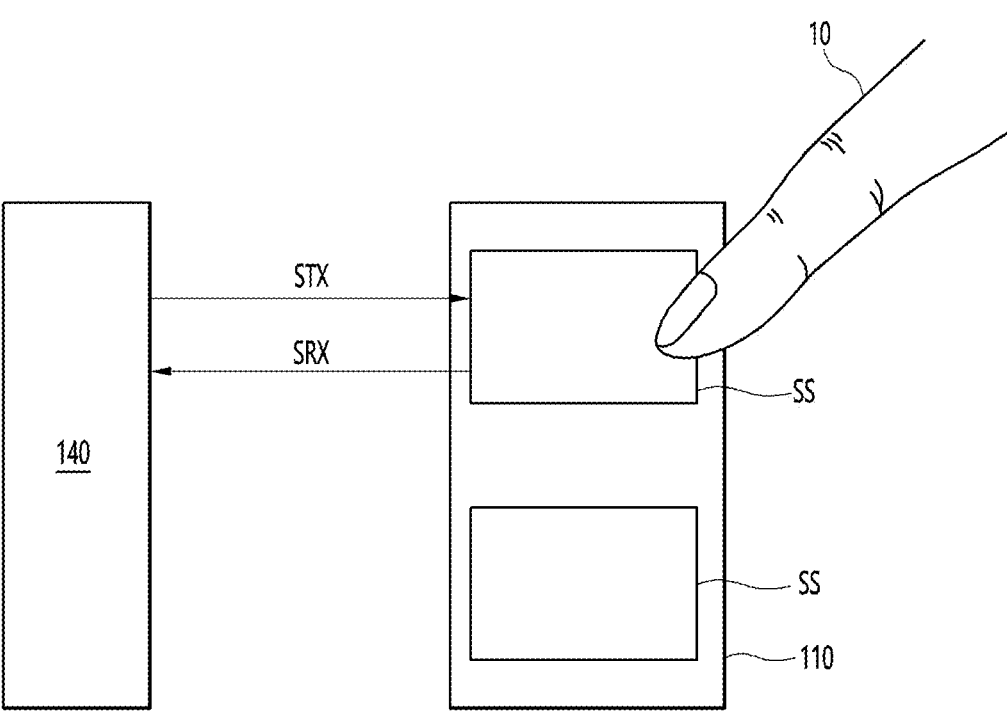
FIG. 2 illustrates a sensing driving device and a panel of FIG. 1.

FIG. 2 illustrates the sensing driving device and panel of FIG. 1.

Referring to FIG. 2, the sensing driving device 140 may supply a driving signal STX to the sensing cell SS of the panel 110.

The driving signal STX may be a voltage signal or a current signal. The driving signal STX may have a pulse-shaped waveform. The pulse-shaped waveform may be various waveforms such as a square wave or a rectangular wave. Hereinafter, for convenience of explanation, embodiments are described assuming that a driving signal STX having a square wave is employed.

The sensing driving device 140 may receive a sensing signal SRX for the driving signal STX from the sensing cell SS. The sensing signal SRX may be an analog signal. The sensing driving device 140 may convert the received sensing signal SRX into a sensing value. The sensing value may be a digital signal. The sensing driving device 140 may sense the touch or proximity of an object 10 using the converted sensing value, and detect the presence or absence of an object, object coordinates, etc.

Figure 3:
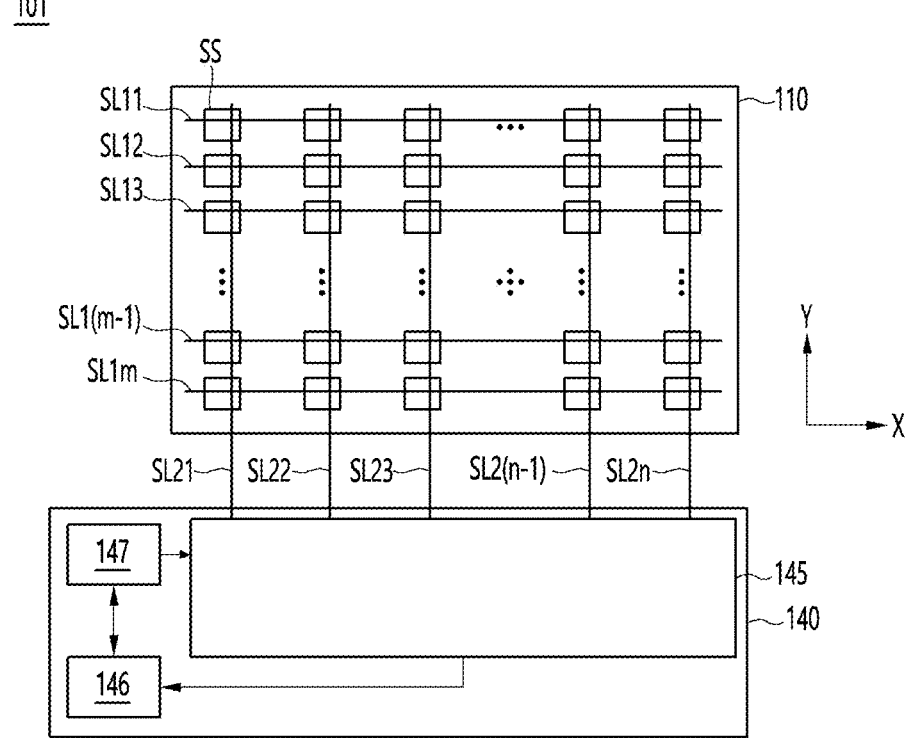
FIG. 3 is a configuration diagram of a display device according to a second aspect of the present disclosure.

FIG. 3 is a configuration diagram of a display device according to a second aspect of the present disclosure.

Referring to FIG. 3, a display device 101 according to the second aspect of the present disclosure may comprise a panel 110 and a sensing driving device 140. Although not shown, the display device 101 according to the second aspect of the present disclosure may comprise the data driving device 120 and the gate driving device 130 shown in FIG. 1.

The panel 110 may display an image. To this end, the panel 110 may comprise a plurality of pixels. Image data may be provided to each of the plurality of pixels, so that a desired color light may be emitted from each of the plurality of pixels.

Meanwhile, the panel 110 may output a sensing signal for recognizing a touch or proximity to an object.

The panel 110 may comprise a display panel for displaying an image and a sensing panel for outputting a sensing signal. The sensing panel may be formed integrally with the display panel or may be arranged on the display panel.

A plurality of sensing cells SS may be arranged on the panel 110. The plurality of sensing cells SS may be arranged in a matrix, but this is not limited thereto. The sensing cell SS may be called a node, a sensing node, a touch node, etc.

The sensing cell SS may comprise a sensing electrode. The sensing electrode may comprise a first sensing electrode and a second sensing electrode, but this is not limited thereto.

For example, a plurality of first sensing lines SL11 to SL1$m$ may be arranged lengthwise on the panel 110 along the X-axis direction. The plurality of first sensing lines SL11 to SL1$m$ may cross the plurality of sensing cells SS, but this is not limited thereto. The plurality of first sensing lines SL11 to SL1$m$ may be connected to the plurality of sensing cells SS. A plurality of driving signals STX may be provided to a plurality of sensing cells SS through a plurality of first sensing lines SL11 to SL1$m$.

For example, a plurality of second sensing lines SL21 to SL2$n$ may be arranged lengthwise on the panel 110 along the Y-axis direction. The plurality of second sensing lines SL21 to SL2$n$ may cross the plurality of sensing cells SS, but are not limited thereto. The plurality of second sensing lines SL21 to SL2$n$ may be connected to the plurality of sensing cells SS. The plurality of sensing signals may be output from the plurality of sensing cells SS through the plurality of second sensing lines SL21 to SL2$n$. The plurality of sensing signals may be generated in response to the driving signal STX.

When an object approaches the panel 110 or a touch occurs by an object, the electrostatic capacitance between the first sensing electrode and the second sensing electrode of the sensing cell SS may change. The electrostatic capacitance thus changed may be included in the sensing signal. That is, a plurality of sensing signals output through a plurality of second sensing lines SL21 to SL2$n$ may change due to the proximity or touch of the object, and the proximity or touch of the object may be recognized based on the changed plurality of sensing signals.

Meanwhile, the sensing driving device 140 may comprise a sensing circuit 145, a memory 146, and a processor 147.

The processor 147 may control or manage the sensing circuit 145 and the memory 146. The processor 147 may exchange information with each of the sensing circuit 145 and the memory 146.

The sensing circuit 145 may generate a plurality of driving signals STX. The sensing circuit 145 may provide a plurality of driving signals STX to a plurality of sensing cells SS arranged on the panel 110. The sensing circuit 145 may provide a plurality of driving signals STX to the panel 110 through a plurality of first sensing lines SL11 to SL1$m$ for each period. For example, a plurality of driving signals STX may be sequentially provided to a plurality of first sensing lines SL11 to SL1$m$ for one period. The plurality of driving signals STX may be provided in the order of a first-first sensing line SL11, a first-second sensing line SL12, . . . , a first-m-th sensing line SL1$m$. Alternatively, for example, a plurality of driving signals STX may be provided simultaneously to a plurality of first sensing lines SL11 to SL1$m$ during one period.

Here, the period may be one frame or a portion of one frame. For example, when one frame is divided into a display section and a sensing section, the period may be a sensing section. For example, when the image display operation and the sensing operation are performed separately from each other, the period may be one frame. That is, the one-frame image display operation and the sensing operation may be performed separately from each other.

The sensing circuit 145 may receive a plurality of sensing signals generated in the panel 110 in response to the plurality of driving signals STX. The sensing circuit 145 may receive the plurality of sensing signals from the plurality of sensing cells SS of the panel 110 through the plurality of second sensing lines SL21 to SL2n.

For example, the sensing circuit 145 may receive a plurality of sensing signals generated from a plurality of sensing cells SS on the 1-1st sensing line SL11 through a plurality of second sensing lines SL21 to SL2n in response to a driving signal STX provided to the 1-1st sensing line SL11. The sensing circuit 145 may receive a plurality of sensing signals generated from a plurality of sensing cells SS on the 1-2nd sensing line SL12 through a plurality of second sensing lines SL21 to SL2n in response to a driving signal STX provided to the 1-2nd sensing line SL12. This operation is repeated, so that the sensing circuit 145 may receive a plurality of sensing signals generated from a plurality of sensing cells SS on the first-m sensing line SL1m through a plurality of second sensing lines SL21 to SL2n in response to the driving signal STX provided to the first-m sensing line SL1m. This operation may be performed for each period. Accordingly, a plurality of sensing signals may be output to the sensing circuit 145 for each period from a plurality of sensing cells SS arranged in a matrix on the panel 110.

In response to a plurality of driving signals STX sequentially provided to a plurality of first sensing lines SL11 to SL1m, a plurality of sensing signals for one line may be sequentially output to the sensing circuit 145 through a plurality of second sensing lines SL21 to SL2n.

The sensing circuit 145 may obtain raw data including multiple sensing values in a matrix form by using multiple sensing signals of one line that are received sequentially, and store the raw data in the memory 146. The sensing circuit 145 may store the raw data in the memory 146 for each period.

Meanwhile, the memory 146 may store a noise detection algorithm. The memory 146 may store data required to drive the sensing driving device 140 or data obtained in the process of driving the sensing driving device 140. The memory 146 may be included in the sensing driving device 140, but may also be provided separately from the sensing driving device 140.

Meanwhile, the processor 147 may execute the noise detection algorithm stored in the memory 146. The processor 147 may be called a controller, a microcontroller unit (MCU), a control device, a sensing controller, a data processing device, etc. The processor 147 may be included in the sensing driving device 140, but may be provided separately from the sensing driving device 140. For example, the processor 147 may be provided in a data processing device, a timing controller, a main processor, etc.

The processor 147 may obtain delta data using raw data received from a sensing circuit or a memory 146 through preprocessing. The raw data may comprise a plurality of sensing values. The plurality of sensing values may each correspond to a plurality of cells SS on the panel 110. The delta data may comprise a plurality of nodes having a plurality of delta values. The plurality of nodes may each correspond to a plurality of cells, but this is not limited.

The processor 147 may label the delta data and finger separate the labeled data. The processor 147 may obtain touch coordinates based on the finger separated data and track the obtained touch coordinates to correct the touch coordinates. When the touch coordinates are corrected, multiple straight lines connecting any two touch coordinates among the obtained touch coordinates are generated, a suitable straight line is determined among the multiple straight lines, and the touch coordinates may be corrected based on the determined suitable straight line.

The processor 147 may smooth the corrected touch coordinates and predict the movement vector of each touch coordinate.

Meanwhile, the processor 147 may perform noise detection using a noise detection algorithm. Noise may be introduced when touching. In this case, the processor 147 may detect noise using the delta data obtained when touching.

The processor 147 may detect noise by considering the sizes of delta values of delta data including various noises. That is, the processor 147 may obtain whether the delta data is included in any of the first range, the second range, and the third range.

Figures 4, 5:
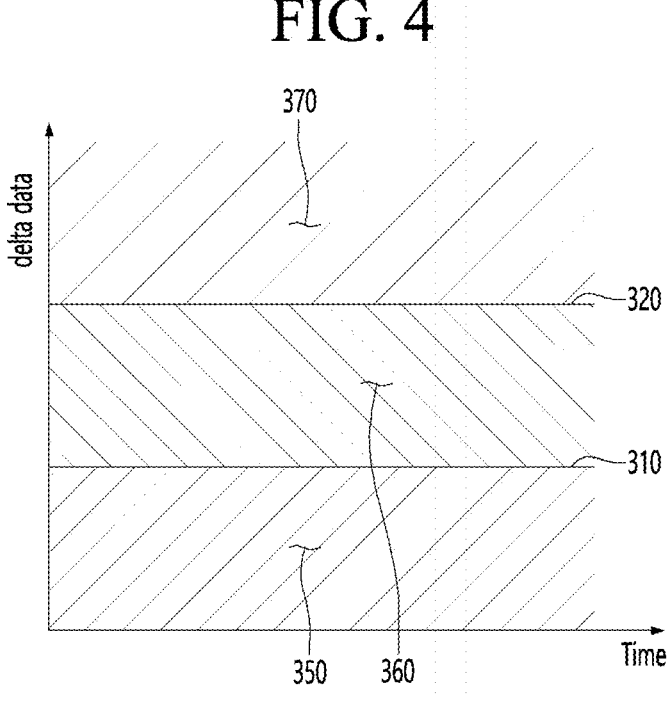
FIG. 4 illustrates a first range, a second range, and a third range set to determine the type of noise using delta data.
FIG. 5 is a flowchart explaining a sensing driving method according to the present disclosure.

For example, as shown in FIG. 4, the type of noise may be determined using the first range 350, the second range 360, and the third range 370. In the present disclosure, the types of noise may be divided into the first noise, the second noise, and the third noise.

The first range 350 may be a range where the delta data is located below the baseline value 310. The baseline value 310 may be used to obtain the delta data. For example, multiple sensing values of the raw data may be classified into positive (+) delta values or negative (−) delta values based on the baseline value 310. A larger positive (+) delta value may indicate a larger touch intensity. When the baseline value 310 is 10 and the sensing value is 50, a delta value of 40 may be obtained, and when the sensing value is 2, a delta value of −8 may be obtained.

The second range 360 may be a range where the delta data is located between the baseline value 310 and the touch on threshold 320. The touch on threshold 320 may be a minimum value for recognizing that there is a touch. The touch on threshold 320 may be greater than the baseline value 310. In this case, a value between the baseline value 310 and the touch on threshold 320 may be recognized as no touch or as second noise.

The third range 370 may be a range in which the delta data is located above the touch on threshold 320. The touch on threshold 320 may be greater than the baseline value 310.

For example, the processor 147 may detect the delta data as the first noise when the delta data is included in the first range 350. As will be described later, when the delta data is included in the first range 350, the delta data may be delta data in Power on Palm, an Electrostatic Discharge (ESD) test, etc., not the first noise. Therefore, when the delta data is included in the first range 350, it is necessary to additionally determine whether it is Power on Palm (or ESD test) or the first noise.

As another example, the processor 147 may detect the delta data as the second noise when the delta data is included in the second range 360. As will be described later, when the delta data is included in the second range 360, the delta data may be no touch, not the second noise. Therefore, when the delta data is included in the second range 360, it is necessary to additionally determine whether it is no touch or the second noise. No touch may mean that an object such as a finger or a pen does not actually touch the panel 110.

As another example, the processor 147 may detect the delta data as the third noise when the delta data is included in the third range 370. As will be described later, when the delta data is included in the third range 370, the delta data may be a real touch, not the third noise. Therefore, when the delta data is included in the third range 370, it is necessary to additionally determine whether it is a real touch or the third noise. An actual touch may mean that an object, such as a finger or pen, actually touches the panel 110.

[Sensing Driving Method]

FIG. 5 is a flowchart explaining a sensing driving method according to the present disclosure.

Referring to FIGS. 3 to 5, the processor 147 may obtain whether the delta data is included in any of the first range 350, the second range 360, and the third range 370 (S210).

Figure 6:
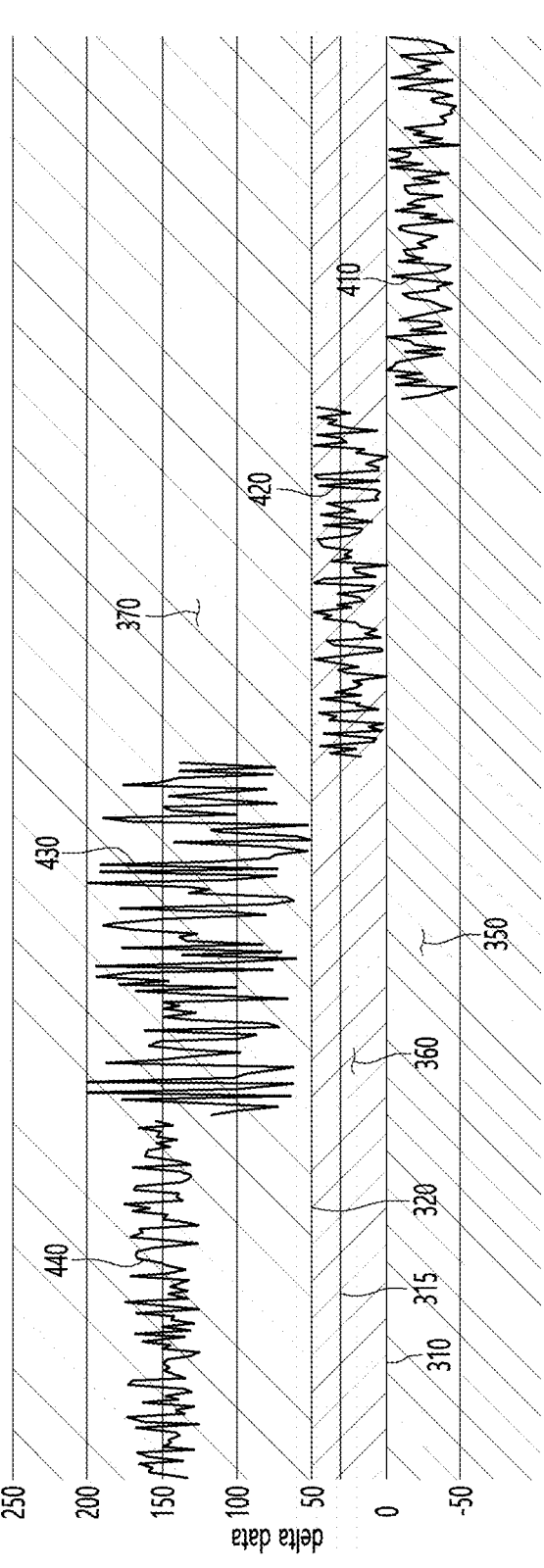
FIG. 6 illustrates delta data including noises of different sizes in the present disclosure.

As illustrated in FIG. 6, when exposed to various environments during a touch or ESD test, the delta data corresponding to the touch may have various size distributions. The various environments may be noise, power on palm, ESD test, no touch, real touch, etc.

In FIG. 6, the horizontal axis represents time, and delta data of tens to hundreds of frames are illustrated according to time. The drawing illustrates a dragging touch, but as illustrated in FIG. 7B, the touch may be initiated, force applied, and then terminated.

For example, the first delta data 410 may have a size distribution less than the baseline value 310. The first delta data 410 may have negative delta values. In the present disclosure, the first delta data 410 may be detected as the first noise or as a power-on palm, ESD test, etc. Since the first noise and the power-on palm, ESD test, etc. are similar, it is necessary to distinguish between the first noise and the power-on palm, ESD test, etc. A method of determining the first noise and the power-on palm, ESD test, etc. will be described later.

For example, the second delta data 420 may have a size distribution between the baseline value 310 and the touch-on threshold 320. For example, the second delta data 420 may have positive delta values. For example, the second delta data 420 may have a size distribution that is greater than or less than the label threshold 315 centered on the label threshold 315. The label threshold 315 may be a minimum delta value for assigning a labeling index to a node. That is, a node having a delta value greater than the label threshold 315 is assigned a labeling index, and a node having a delta value less than the label threshold 315 is not assigned a labeling index. The second delta data 420 may be detected as second noise or as no touch. Since the second noise and no touch are similar, it is necessary to distinguish between the second noise and no touch. A method of determining the second noise and no touch will be described later.

For example, the third delta data 430 and the fourth delta data 440 may have a size distribution that is greater than or equal to the touch-on threshold 320. The size distribution of the third delta data 430 may be greater than that of the fourth delta data 440. For example, the third delta data 430 may be detected as noise, and the fourth delta data 440 may be detected as an actual touch. Later, the method in which the third delta data 430 and the fourth delta data 440 are detected as the third noise and the actual touch, respectively, will be described.

Meanwhile, the processor 147 may detect different noises depending on the range in which the delta data is included (S220). Here, the first noise, the second noise, and the third noise may be noises having different types. For example, when the delta data is included in the first range 350, the delta data may be detected as the first noise when it is not a power-on palm (or ESD test), when the delta data is included in the second range 360, the delta data may be detected as the second noise when a touch on/off toggle occurs, and when the delta data is included in the third range 370, the delta data may be detected as the third noise when the difference between the current delta data and the previous delta data is greater than a threshold.

Figure 7A:
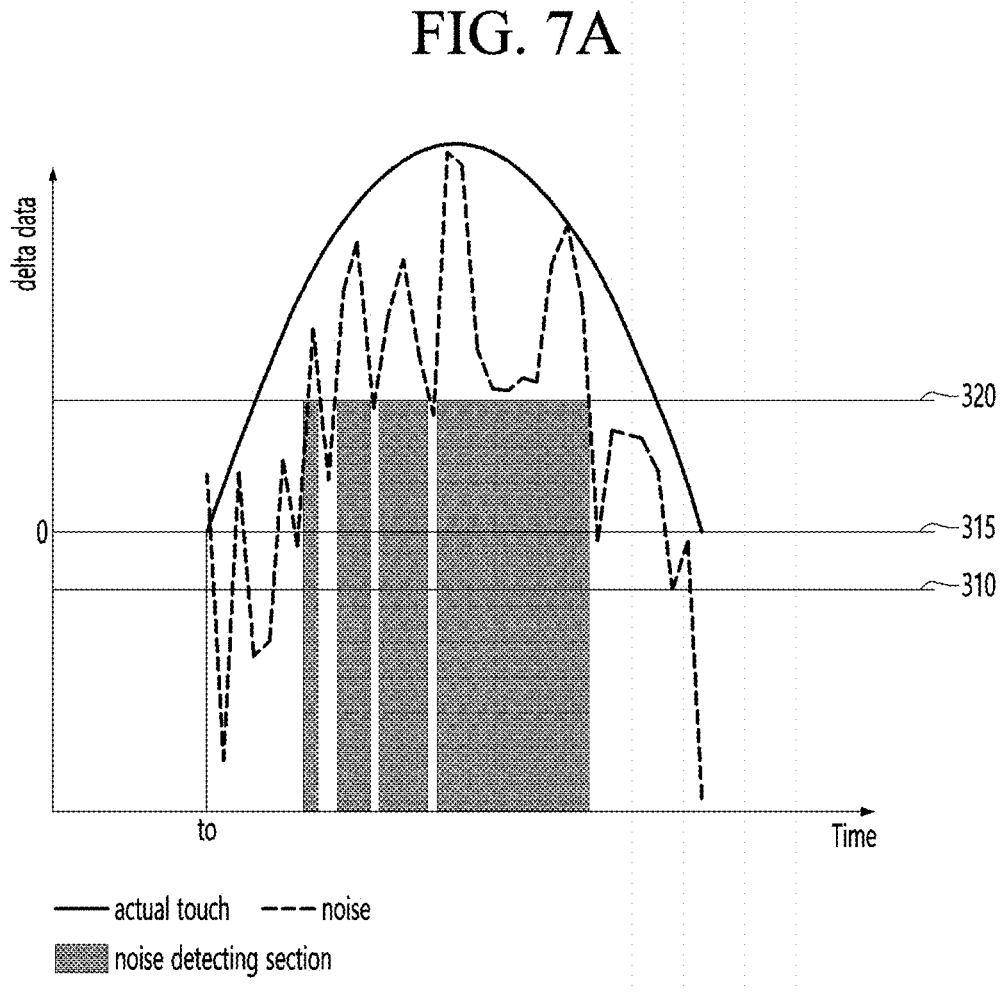
FIG. 7A illustrates a state in which noise below a touch-on threshold is not detected.
Figure 7B:
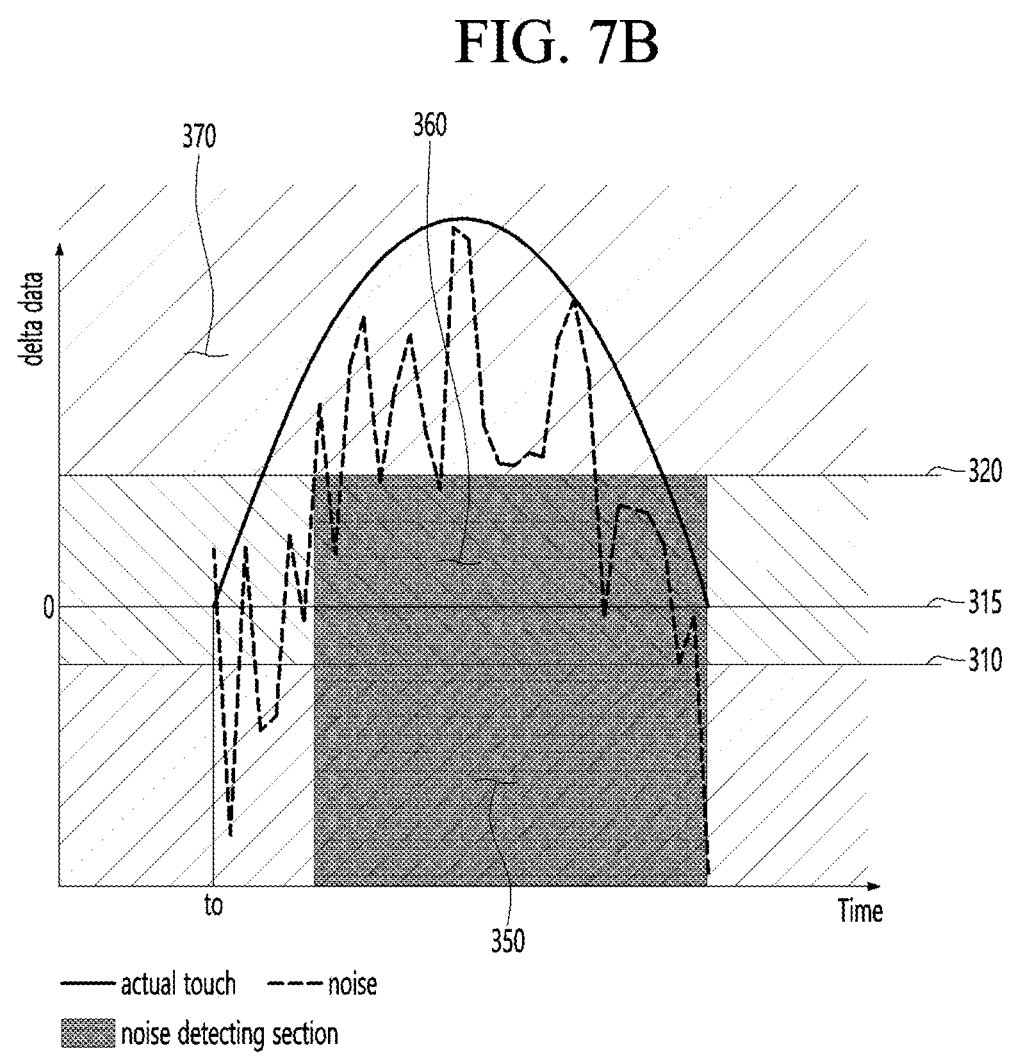

FIG. 7A illustrates a conventional appearance where noise below the touch-on threshold 320 is not detected. FIG. 7B illustrates a conventional appearance where noise above and below the touch-on threshold 320 is detected according to the present disclosure.

In FIGS. 7A and 7B, the actual touch represents delta data that does not include noise when an object such as a finger or a pen actually touches the panel, and noise may represent delta data that includes noise regardless of whether the object actually touches or does not touch the panel. Conventionally, noise detection was possible only for values above the touch-on threshold 320. In this case, as shown in FIG. 7A, when noise is introduced during an actual touch, when the delta data including the actual touch with the noise reflected is above the touch-on threshold 320, the corresponding touch may be recognized (or detected).

However, conventionally, when the delta data including noise is below the touch-on threshold 320, the corresponding noise is not detected. In addition, when noise is not detected, there is a problem that the change in driving frequency is delayed and a disconnection phenomenon occurs.

A disconnection phenomenon refers to a phenomenon in which malfunctions such as line breaking, line flies, integration of two lines into one line, and crossing of two lines occur during a touch draw. On the other hand, even if noise occurs, when the noise is less than the touch-on threshold 320, the noise is not detected. Since noise occurs, the driving frequency of the panel must be changed to a frequency to avoid the noise, i.e., a hopping frequency. However, when the noise is less than the touch-on threshold 320 and thus not detected, the driving frequency may not be changed or the driving frequency may be delayed.

In contrast, as shown in FIG. 7B, according to the present disclosure, various noises may be detected regardless of the size of the delta data including the noise. That is, various noises may be detected even when the delta data is not only above the touch-on threshold 320 but also below the touch-on threshold 320 or below the baseline value 310. In addition, according to the present disclosure, even if any type of noise is detected, the hopping frequency may be changed to offset the noise, so that different types of noise may be offset or alleviated.

Figure 8:
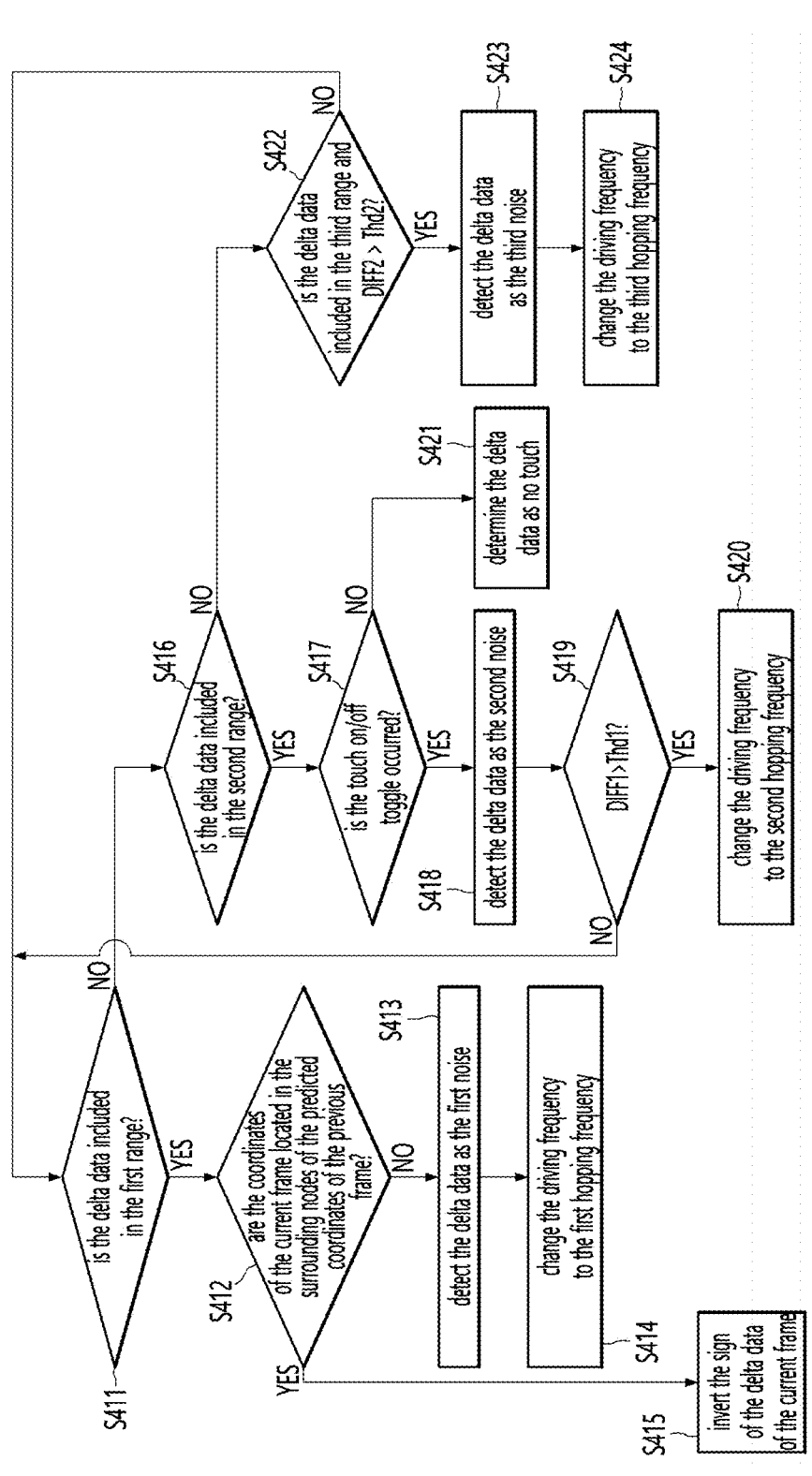
FIG. 8 is a flowchart explaining a sensing driving method according to the present disclosure in detail.

FIG. 8 is a flowchart detailing a sensing driving method according to the present disclosure.

Referring to FIGS. 3 to 5 and FIG. 8, the processor 147 may obtain whether the delta data is included in the first range 350 (S411).

Figure 9:
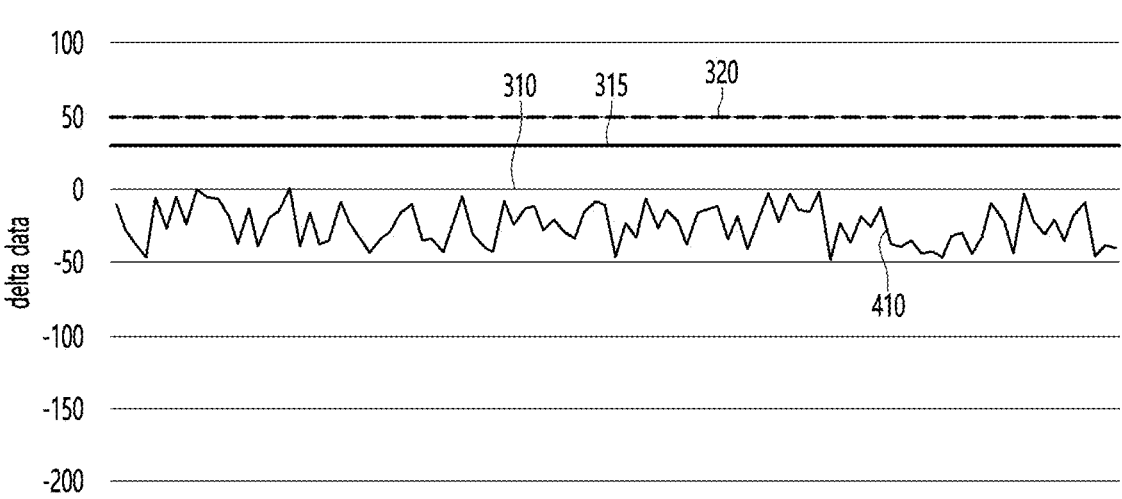
FIG. 9 illustrates the first delta data in the present disclosure.

As shown in FIG. 9, the first delta data 410 may have a size distribution less than the baseline value 310. The first delta data 410 less than the baseline value 310 may be the first noise or the delta data in the power-on farm (or ESD test).

Referring again to FIG. 8, when the delta data is included in the first range 350, the processor 147 may obtain whether the coordinates of the current frame are located in the surrounding nodes of the predicted coordinates of the previous frame (S412). By S412, it may be determined whether the delta data is the first noise or the power on palm (or ESD test).

Figure 10A:
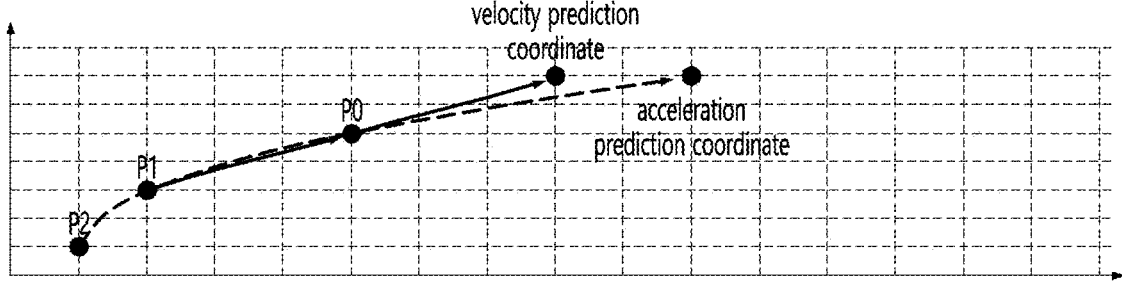
FIG. 10A illustrates how the velocity prediction coordinate and/or the acceleration prediction coordinate are calculated using the delta data of the previous frames.

As illustrated in FIG. 10A, coordinates (P0, P1, P2) may be derived using the delta data of the previous frames. For example, coordinates (P0, P1, P2) may be derived using the weighted sum method.

TABLE 1

| | Col7 | Col8 | Col9 | Col10 |
|---|---|---|---|---|
| Row11 | 0 | 6 | 4 | 0 |
| Row12 | 21 | 105 | 68 | 4 |
| Row13 | 32 | 149 | 100 | 6 |
| Row14 | 0 | 35 | 23 | 0 |

As shown in Table 1, weighted sum values (weighted x_sum) and total values (SUM1) may be obtained in the column direction for delta data (Table 2), and weighted sum values (weighted y_sum) and total values (SUM2) may be obtained in the row direction (Table 3).

TABLE 2

| Weight Value | Col7 | Col8 | Col9 | Col10 | SUM1 |
|---|---|---|---|---|---|
| x_sum | 53 | 295 | 195 | 10 | 553 |
| Weighted x_sum | 371 | 2360 | 1755 | 100 | 4586 |

TABLE 3

| Weighted Value | y_sum | Weighted y_sum |
|---|---|---|
| Row11 | 10 | 110 |
| Row12 | 198 | 2376 |
| Row13 | 287 | 3731 |
| Row14 | 58 | 812 |
| SUM2 | 553 | 7029 |

By substituting the values shown in Table 2 and Table 3 into Equation 1, the coordinates for the touch area shown in Table 1 may be calculated. That is, X may be 4586/553=8.24, and Y may be 7029/553=12.71.

$$X = (\text{weighted x\_sum}/\text{x\_sum})$$ [Equation 1]

$$Y = (\text{weighted y\_sum}/\text{y\_sum})$$

Therefore, by using Tables 1 to 3 and Equation 1, coordinates (P0, P1, P2) may be derived.

In addition, velocity prediction coordinates and/or acceleration prediction coordinates may be derived using delta data of previous frames. The coordinates of the current frame may be derived using delta data of the current frame.

Velocity prediction coordinates and acceleration prediction coordinates may be derived through Equation 2.

$$Ve = P0 + (P0 - P1)$$ [Equation 2]

$$Ae = P0 + [(P0 - P1) + [(P0 - P1) - (P1 - P2)]]$$

Ve may represent velocity prediction coordinates, and Ae may represent acceleration prediction coordinates.

Referring back to FIG. 8, when the coordinate of the current frame is not located in the peripheral node of the predicted coordinate of the previous frame, the processor 147 may detect the delta data as the first noise (S413).

The processor 147 may change the driving frequency to the first hopping frequency (S414). The first noise may be offset or alleviated by the first nominal frequency.

When the coordinate of the current frame is located in the peripheral node of the predicted coordinate of the previous frame, the processor 147 may determine the delta data of the current frame as the power-on palm (or ESD test) and invert the sign of the delta data of the current frame (S415). Accordingly, the processor 147 may correctly recognize (or detect) the corresponding delta data as the power-on palm (or ESD test) and perform an operation for the power-on palm (or ESD test).

As illustrated in FIG. 10B, when the delta values of the delta data are −25, −35, −50, −35, and −45, respectively, the delta values may be inverted to +25, +35, +50, +35, and +45, respectively.

Meanwhile, referring to FIG. 8 again, when the delta data is included in the second range 360 (S416), the processor 147 may obtain whether the touch on/off toggle occurs (S417).

Figure 11:
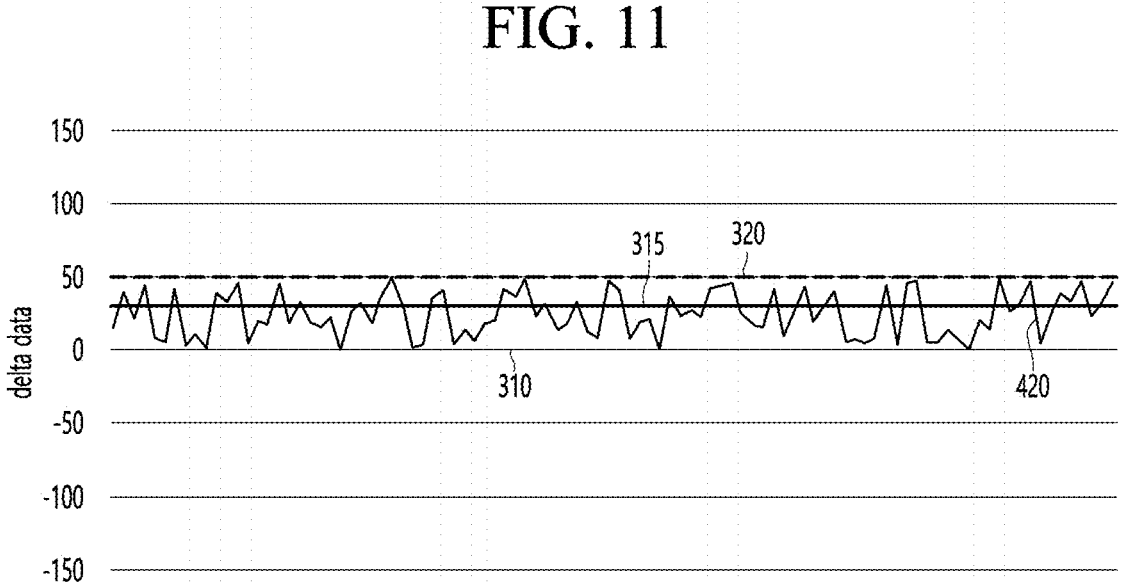
FIG. 11 illustrates the second delta data in the present disclosure.

As illustrated in FIG. 11, the second delta data 420 may have a size distribution between the baseline value 310 and the touch on threshold 320. In addition, since the second delta data 420 has a size distribution that is greater or less than the label threshold 315, it may have delta data having a delta value to which a labeling index may be assigned for each frame and delta data having a delta value to which a labeling index cannot be assigned. Therefore, the second delta data 420 having a size distribution between the baseline value 310 and the touch on threshold 320 may be second noise or no touch. Therefore, it is necessary to determine whether the second delta data 420 is no touch or second noise.

Figure 12A:
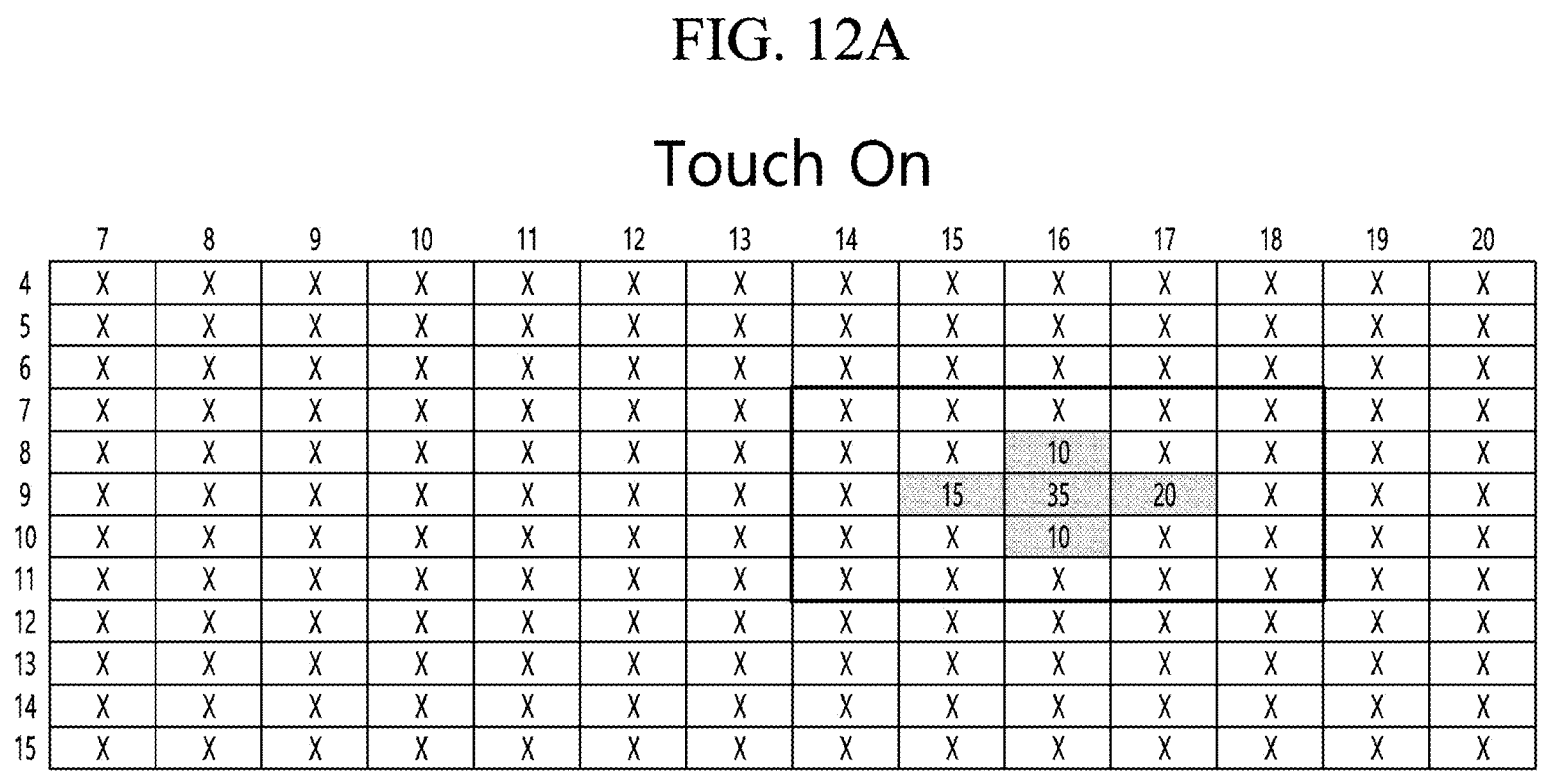
Figure 12B:
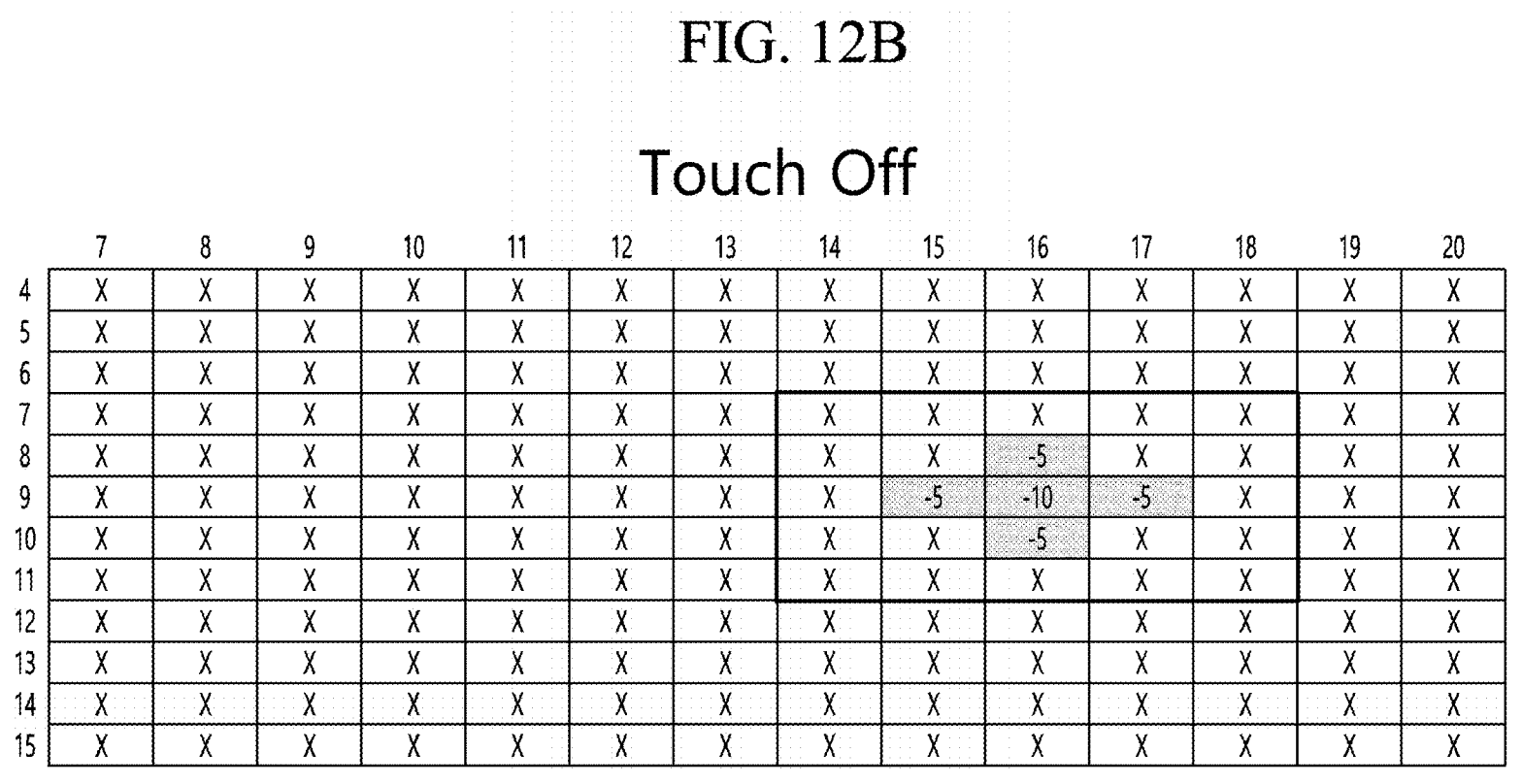

As shown in FIGS. 12A and 12B, the delta data of the previous frame may comprise positive (+) delta values, and the delta data of the next frame may comprise negative (−) delta values. In this case, the delta data of the previous frame may be touch on data, and the delta data of the next frame may be touch off data. In this way, by repeating the touch on data and the touch off data, a touch on/off toggle may occur. For example, the number of repetitions of touch-on data and touch-off data may be 3 to 7. That is, when touch-on data and touch-off data are repeated 3 to 7 times, it may be considered that a touch-on/off toggle has occurred. For example, when the number of repetitions of touch-on data and touch-off data is 2, it may be considered that a touch-on/off toggle has not occurred.

Referring again to FIG. 8, when a touch-on/off toggle occurs, the processor 147 may detect delta data as second noise (S418).

When the difference DIFF1 between the current delta data and the previous delta data is greater than the first threshold Thd1 (S419), the processor 147 may change the driving frequency to the second hopping frequency (S420).

The previous delta data may be an average value of delta data of each of the preset frames. For example, the maximum delta value is selected from the delta values of the delta data of each frame, and the previous delta data may be obtained by averaging the maximum delta values selected from the delta data during the preset frames. The current delta data may be the maximum delta value from the delta values of the delta data of the current frame.

Therefore, when the difference DIFF1 between the maximum delta value of the delta data of the current frame and the average value of the previous delta data, i.e., the maximum delta values, is greater than the first threshold Thd1, the driving frequency may be changed to the second hopping frequency. The second noise may be offset or alleviated by the second hopping frequency.

When the touch on/off toggle does not occur, the processor 147 may determine the delta data as no touch (S421). No touch may mean that an object such as a finger or a pen does not actually touch the panel 110.

As described above, depending on whether the touch on/off toggle occurs, it may be determined whether the delta data is no touch or second noise.

Meanwhile, when the delta data is included in the third range 370, the processor 147 may obtain whether the difference DIFF2 between the current delta data and the previous delta data is greater than the second threshold Thd2 (S422).

Figure 13:
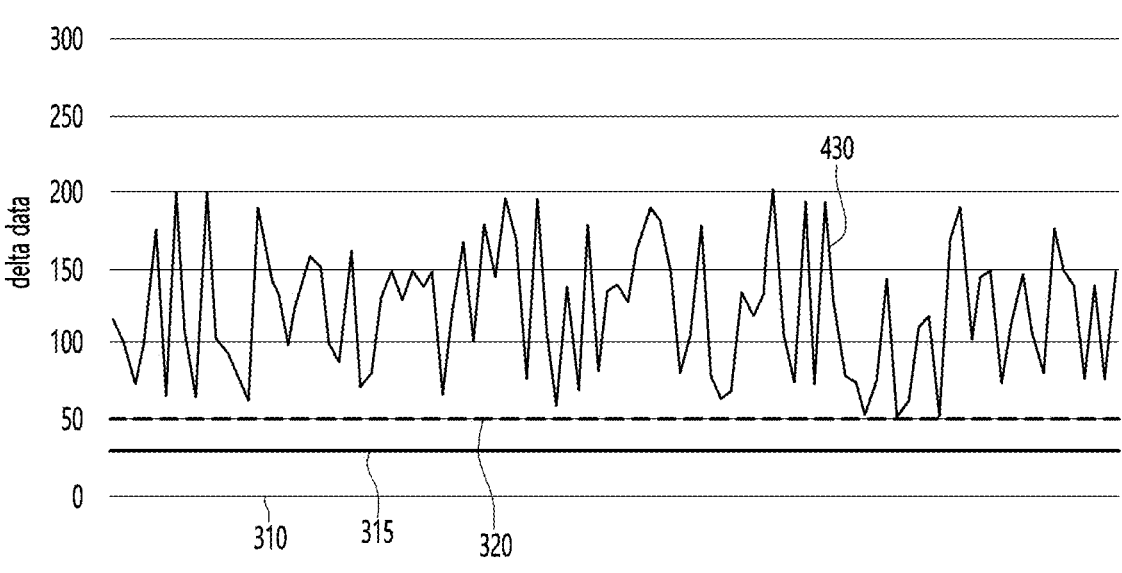
FIG. 13 illustrates the third delta data in the present disclosure.
Figure 14:
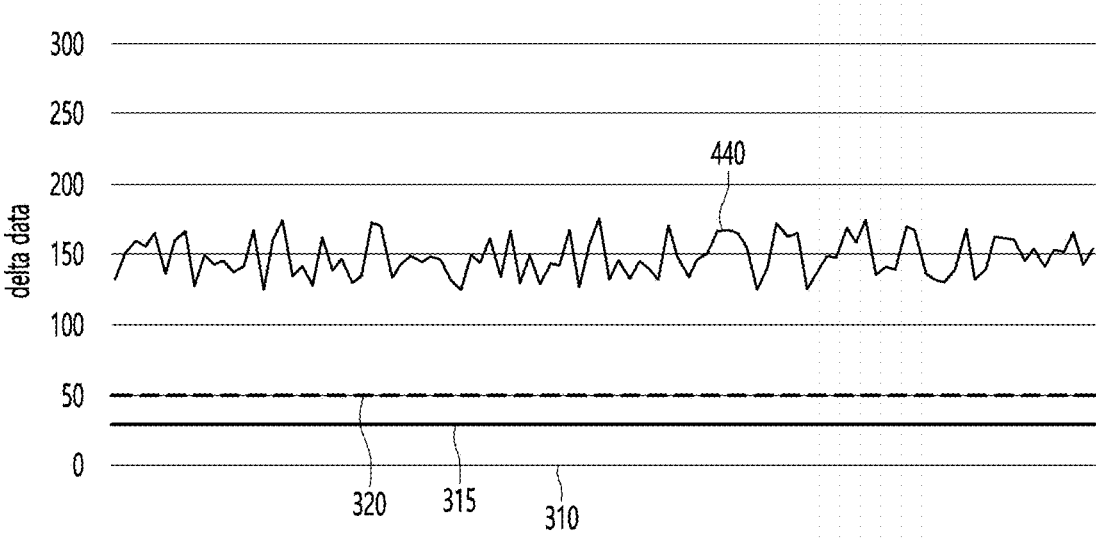
FIG. 14 illustrates the fourth delta data in the present disclosure.

Here, the delta data may be the third delta data 430 illustrated in FIG. 13 or the fourth delta data 440 illustrated in FIG. 14.

The third delta data 430 and the fourth delta data 440 are greater than the touch on threshold 320, but their size distributions may be different from each other. The size distribution of the third delta data 430 may be greater than the size distribution of the fourth delta data 440. For example, the size distribution of the third delta data 430 may be ±50 to 150 based on a delta value of 150, while the size distribution of the fourth delta data 440 may be ±15 based on a delta value of 150.

Meanwhile, the previous delta data may be the average value of the delta data of each of the preset frames. The current delta data may be the maximum delta value among the delta values of the delta data of the current frame.

Referring again to FIG. 8, the processor 147 may detect the delta data as the second noise when the difference DIFF2 between the current delta data and the previous delta data is greater than the second threshold Thd2 (S423).

For example, when the difference DIFF2 between the maximum delta value of the delta data of the current frame and the average value of the previous delta data, i.e., the maximum delta values, is greater than the second threshold Thd2, the delta data may be detected as the second noise.

When delta data is detected as second noise, the processor 147 may change the driving frequency to the third hopping frequency (S424).

The first hopping frequency, the second hopping frequency, and the third hopping frequency may have different values. For example, the second hopping frequency may be greater than the first hopping frequency, and the third hopping frequency may be greater than the second hopping frequency, but this is not limited thereto.

The processor 147 may determine the delta data as an actual touch when the difference DIFF2 between the current delta data and the previous delta data is less than the second threshold Thd2. An actual touch may mean that an object such as a finger or a pen actually touches the panel 110.

The above detailed description should not be construed as limiting in all respects and should be considered as illustrative. The scope of the aspects should be determined by a reasonable interpretation of the appended claims, and all changes within the equivalent scope of the aspects are included in the scope of the aspects.

What is claimed is:

1. A sensing driving device, comprising:
a sensing circuit configured to obtain raw data from a panel; and
a processor configured to obtain delta data from the raw data using a baseline value,
wherein the processor is configured to:
detect one type of noise from among a plurality of noise types based on whether the delta data is included in any one of a first range, a second range, and a third range, and change a driving frequency of the panel to one of a plurality of hopping frequencies based on the detected type of noise,
wherein the first range is a range in which the delta data is located below the baseline value, the second range is a range in which the delta data is located between the baseline value and a touch-on threshold, and the third range is a range in which the delta data is located above the touch-on threshold, and
wherein the touch-on threshold is greater than the baseline value.

2. The sensing driving device of claim 1, wherein the processor is configured to:
when the delta data is included in the first range, obtain whether the coordinate of a current frame is located in a peripheral node of a predicted coordinate of a previous frame,
when the coordinate of the current frame is not located in the peripheral node of the predicted coordinate of the previous frame, detect the one type of noise as a first noise, and
when the first noise is detected, change the driving frequency to a first hopping frequency.

3. The sensing driving device of claim 2, wherein the processor is configured to invert a sign of the delta data of the current frame when the coordinate of the current frame is located in the peripheral node of the predicted coordinate of the previous frame.

4. The sensing driving device of claim 1, wherein the processor is configured to:
when the delta data is included in the second range, obtain whether a touch on/off toggle occurs,
when the touch on/off toggle is occurred, detect the one type of noise as a second noise, and
when the second noise is detected, change the driving frequency to a second hopping frequency.

5. The sensing driving device of claim 4, wherein the processor is configured to obtain whether to change to the second hopping frequency based on a difference between the current delta data and the previous delta data when the touch on/off toggle is occurred.

6. The sensing driving device of claim 5, wherein the previous delta data is an average value of a maximum delta data of each of preset frames.

7. The sensing driving device of claim 4, wherein the processor is configured to determine the delta data as no touch when the touch on/off toggle does not occur.

8. The sensing driving device of claim 1, wherein the processor is configured to:
when the delta data is included in the third range, detect whether the one type of noise is a third noise, and
when the third noise is detected, change the driving frequency to a third hopping frequency.

9. The sensing driving device of claim 8, wherein the processor is configured to determine whether the one type of noise is the third noise based on a difference between the current delta data and the previous delta data.

10. A sensing driving method, comprising:
detecting one type of noise from among a plurality of noise types based on whether delta data is included in any one of a first range, a second range, and a third range; and
changing a driving frequency of a panel to one of a plurality of hopping frequencies based on the detected type of noise,
wherein the delta data is obtained from the raw data using a baseline value, wherein the first range is a range in which the delta data is located below the baseline value, the second range is a range in which the delta data is located between the baseline value and a touch-on threshold, and the third range is a range in which the delta data is located above the touch-on threshold, and wherein the touch-on threshold is greater than the baseline value.

11. The sensing driving method of claim 10, further comprising:

when the delta data is included in the first range, obtaining whether a coordinate of a current frame is located in a peripheral node of a predicted coordinate of a previous frame;

when the coordinate of the current frame is not located in the peripheral node of the predicted coordinate of the previous frame, detecting the one type of noise as a first noise; and when the first noise is detected, changing the driving frequency to a first hopping frequency.

12. The sensing driving method of claim 11, further comprising inverting a sign of the delta data of the current frame when the coordinate of the current frame is located in the peripheral node of the predicted coordinate of the previous frame.

13. The sensing driving method of claim 10, further comprising:

when the delta data is included in the second range, determining whether a touch on/off toggle occurs;

when the touch on/off toggle is occurred, detecting the one type of noise as a second noise; and when the second noise is detected, changing the driving frequency to a second hopping frequency.

14. The sensing driving method of claim 13, further comprising determining whether to change to the second hopping frequency based on a difference between the current delta data and the previous delta data when the touch on/off toggle is occurred.

15. The sensing driving method of claim 14, wherein the previous delta data is an average value of a maximum delta data of each of preset frames.

16. The sensing driving method of claim 13, further comprising determining the delta data as no touch when the touch on/off toggle does not occur.

17. The sensing driving method of claim 10, further comprising:

when the delta data is included in the third range, determining whether the one type of noise is a third noise; and when the third noise is detected, changing the driving frequency to a third hopping frequency.

18. The sensing driving method of claim 17, further comprising detecting whether the one type of noise is the third noise based on a difference between the current delta data and the previous delta data.

* * * * *